US012791474B2

(12) United States Patent
Suzuki et al.

(10) Patent No.: US 12,791,474 B2
(45) Date of Patent: Nov. 10, 2026

(54) GAS ANALYZER AND GAS ANALYSIS METHOD

(71) Applicant: Yokogawa Electric Corporation, Musashino (JP)

(72) Inventors: Yuta Suzuki, Musashino (JP); Yuma Kitagawa, Musashino (JP); Toshiyuki Saruya, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 18/933,008

(22) Filed: Oct. 31, 2024

(65) Prior Publication Data

US 2025/0172492 A1 May 29, 2025

(30) Foreign Application Priority Data

Nov. 29, 2023 (JP) ................................. 2023-202104

(51) Int. Cl.
*G01N 21/39* (2006.01)

(52) U.S. Cl.
CPC .................................... *G01N 21/39* (2013.01)

(58) Field of Classification Search
CPC .... G01N 21/39; G01N 21/31; G01N 33/0062; G01N 21/03; G01N 2201/061; G01N 33/00; G01N 21/00
See application file for complete search history.

(56) References Cited

U.S. PATENT DOCUMENTS

2016/0187251 A1 6/2016 Kavoori Sethumadhavan et al.
2016/0299065 A1 10/2016 Steinbacher
2019/0317018 A1 * 10/2019 Kobayashi ................ G01J 3/42

FOREIGN PATENT DOCUMENTS

JP 5-79976 A 3/1993
JP 2001-74653 A 3/2001
JP 2010-169487 A 8/2010
JP 2023-085855 A 6/2023

OTHER PUBLICATIONS

Extended European Search Report dated Apr. 7, 2025, issued in counterpart EP Application No. 24210062.6. (51 pages).
Fernholz, T. et al., Digital, phase-sensitive detection for in situ diode-laser spectroscopy under rapidly changing transmission conditions, Applied Physics B, vol. 75, pp. 229-236, XP002330406, 2002. (8 pages); cited in Extended European Search Report dated Apr. 7, 2025.
Office Action dated Sep. 1, 2026, issued in counterpart JP Application No. 2023-202104, with English translation. (8 pages).

* cited by examiner

*Primary Examiner* — Georgia Y Epps
*Assistant Examiner* — Don J Williams
(74) *Attorney, Agent, or Firm* — WHDA, LLP

(57) ABSTRACT

A gas analyzer includes a calculator. The calculator calculates an intensity of one concentration signal based on an intensity of one frequency component of returned light yielded by multiply-modulated measurement light passing and coming back through a gas to be measured, or intensities of a plurality of concentration signals based on respective intensities of a plurality of frequency components of the returned light. The calculator calculates a measured value of concentration of the gas to be measured, based on the intensity of the one concentration signal or the intensities of the plurality of concentration signals.

18 Claims, 8 Drawing Sheets

GAS ANALYZER AND GAS ANALYSIS METHOD

CROSS-REFERENCE TO RELATED APPLICATION

The present application claims priority to Japanese Patent Application No. 2023-202104 filed on Nov. 29, 2023, the entire contents of which are incorporated herein by reference.

TECHNICAL FIELD

The present disclosure relates to a gas analyzer and a gas analysis method.

BACKGROUND

Apparatuses for measuring gas concentration by means of laser light are known, as described in Patent Literature (PTL) 1.

CITATION LIST

Patent Literature

PTL 1: JP H5-79976 A

SUMMARY

A gas analyzer according to several embodiments includes a calculator. The calculator calculates an intensity of one concentration signal based on an intensity of one frequency component of returned light yielded by multiply-modulated measurement light passing and coming back through a gas to be measured, or intensities of a plurality of concentration signals based on respective intensities of a plurality of frequency components of the returned light. The calculator calculates a measured value of concentration of the gas to be measured, based on the intensity of the one concentration signal or the intensities of the plurality of concentration signals.

A gas analysis method according to several embodiments includes calculating, by a gas analyzer, an intensity of one concentration signal based on an intensity of one frequency component of returned light yielded by multiply-modulated measurement light passing and coming back through a gas to be measured, or intensities of a plurality of concentration signals based on respective intensities of a plurality of frequency components of the returned light, and calculating, by the gas analyzer, a measured value of concentration of the gas to be measured, based on the intensity of the one concentration signal or the intensities of the plurality of concentration signals.

DETAILED DESCRIPTION

Figure 1:
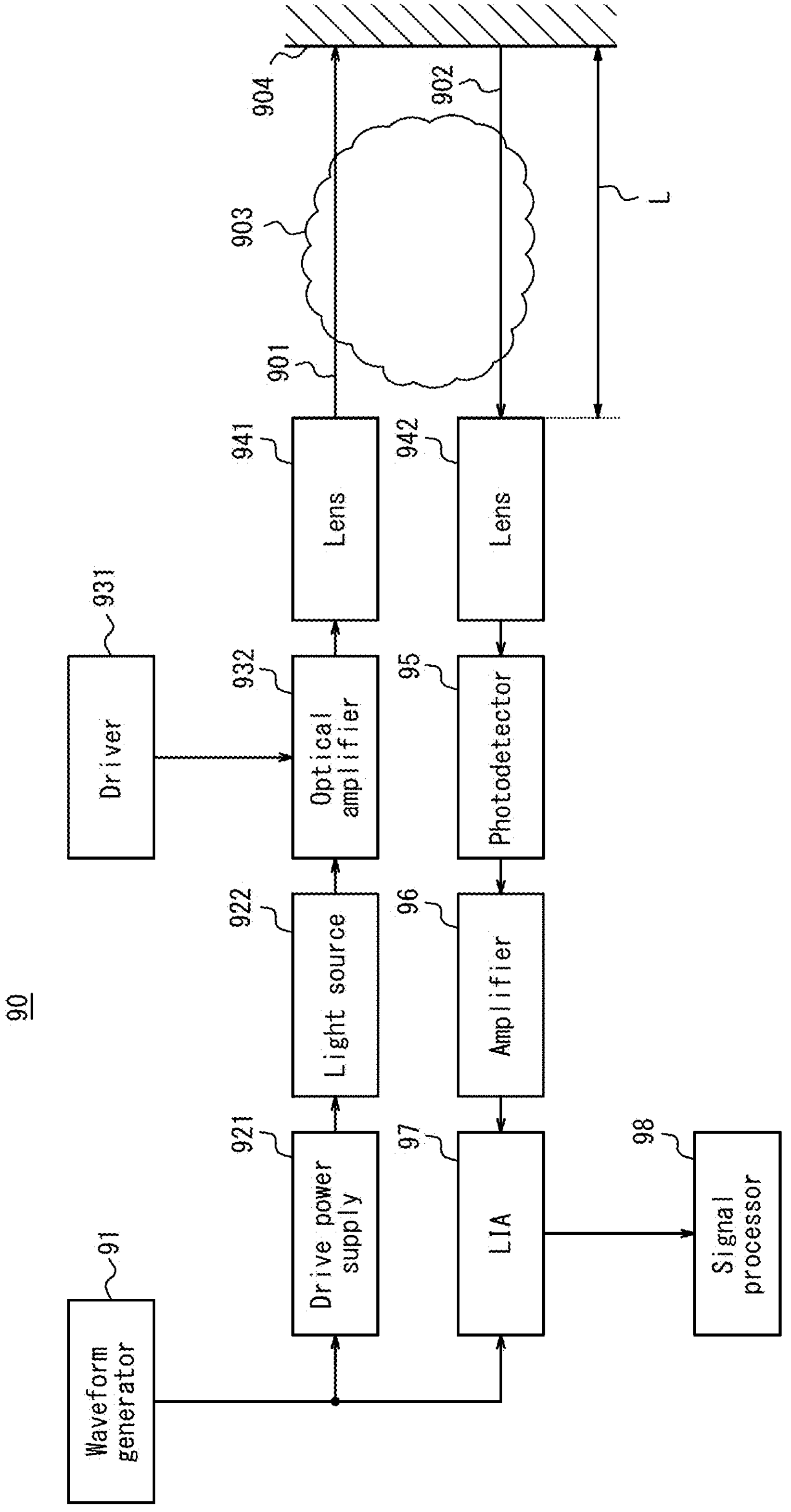
FIG. 1 is a schematic diagram illustrating a configuration example of a gas analyzer according to a comparative example.

According to the gas analyzer and gas analysis method of the present disclosure, the accuracy of gas concentration measurement is improved.

(1) A gas analyzer according to several embodiments includes a calculator. The calculator calculates an intensity of one concentration signal based on an intensity of one frequency component of returned light yielded by multiply-modulated measurement light passing and coming back through a gas to be measured, or intensities of a plurality of concentration signals based on respective intensities of a plurality of frequency components of the returned light. The calculator calculates a measured value of concentration of the gas to be measured, based on the intensity of the one concentration signal or the intensities of the plurality of concentration signals.

By using a doubly modulated laser light, the gas analyzer according to the present disclosure can make the intensity of the returned light intensity signal less prone to decreasing when the gas concentration increases, while maintaining the accuracy of gas concentration measurement, as compared to the case of using singly modulated laser light. Suppression of the decrease in intensity of the returned light intensity signal makes the returned light intensity signal less likely to degrade even when the gas concentration is high. Consequently, a situation such that it becomes impossible to determine the cause of the decrease in the returned light intensity signal can be avoided, even when the gas concentration is high.

By using a doubly modulated laser light, the gas analyzer according to the present disclosure can also acquire the concentration signal so that the linearity of the calibration curve increases. Wide dynamic range measurement can be performed by increasing the linearity of the calibration curve. As a result, the measurement accuracy of a wide range of gas concentrations can be improved as compared to the case of using singly modulated laser light. By using a doubly modulated laser light, the gas analyzer according to the present disclosure can also acquire a concentration signal that avoids a specific noise frequency. The accuracy of gas concentration measurement is improved by the ability to acquire a concentration signal that avoids a specific noise frequency.

(2) In the gas analyzer according to (1), the calculator may calculate a plurality of candidate values that become candidates for the measured value of concentration of the gas to be measured, based on the respective intensities of the plurality of concentration signals. The calculator may calculate the concentration of the gas to be measured, based on the plurality of candidate values.

By calculating a plurality of candidate values based on the intensities of a plurality of frequency components, the gas analyzer according to the present disclosure can appropriately select between high sensitivity measurement and wide dynamic range measurement, or avoid specific frequencies of noise. As a result, the accuracy of gas concentration measurement can be improved.

(3) In the gas analyzer according to (2), the calculator may select one candidate value among the plurality of candidate values as the measured value of the concentration of the gas to be measured, based on a signal-to-noise (SN) ratio of the concentration signal. By a measured value of the gas concentration being selected from among the plurality of candidate values, the accuracy of gas concentration measurement is improved.

(4) In the gas analyzer according to (2), the calculator may calculate an average of at least two candidate values among the plurality of candidate values as the measured value of the concentration of the gas to be measured. Calculation of the average of a plurality of candidate values avoids a situation in which the measurement accuracy deteriorates significantly due to incorrect selection from among the plurality of candidate values. As a result, the accuracy of gas concentration measurement can be improved.

(5) The gas analyzer according to any one of (1) to (4) may further include a light source configured to emit the measurement light, wherein the light source is configured to enable setting of a modulation frequency of the measurement light. By configuring the light source to enable setting of the modulation frequency, the measurement light is modulated appropriately according to the component to be measured. As a result, the accuracy of gas concentration measurement can be improved.

(6) A gas analysis method according to several embodiments includes calculating, by a gas analyzer, an intensity of one concentration signal based on an intensity of one frequency component of returned light yielded by multiply-modulated measurement light passing and coming back through a gas to be measured, or intensities of a plurality of concentration signals based on respective intensities of a plurality of frequency components of the returned light, and calculating, by the gas analyzer, a measured value of concentration of the gas to be measured, based on the intensity of the one concentration signal or the intensities of the plurality of concentration signals.

Comparative Example

A gas analyzer 90 according to a comparative example measures the concentration of a gas to be measured 903 based on the absorbance of laser light transmitted through the gas to be measured 903. The method of measuring gas concentration based on the absorbance of laser light is also referred to as Wavelength Modulation Spectroscopy (WMS).

In the case of measuring the concentration of the gas to be measured 903 by WMS, the gas analyzer 90 acquires a signal containing information about the concentration of the gas to be measured 903 by transmitting laser light modulated in wavelength at a single frequency f through the gas to be measured 903. The concentration of the gas to be measured 903 is proportional to the intensity of the component having a frequency of 2f, which is the second harmonic of the single modulation frequency, among the frequency components of the laser light transmitted through the gas to be measured 903.

As illustrated in FIG. 1, the gas analyzer 90 according to the comparative example includes a waveform generator 91, a drive power supply 921, a light source 922, a driver 931, an optical amplifier 932, lenses 941 and 942, a photodetector 95, an amplifier 96, a lock-in amplifier (LIA) 97, and a signal processor 98.

The gas analyzer 90 emits a measurement light 901 from the lens 941 toward the gas to be measured 903. The measurement light 901 is light modulated at a single frequency.

The waveform generator 91 generates a signal waveform of the modulation frequency and outputs the signal waveform to the drive power supply 921 and the LIA 97. The drive power supply 921 outputs a drive signal, based on the signal waveform of the modulation frequency inputted from the waveform generator 91, to drive the light source 922. The drive signal is a signal in which a sinusoidal AC signal of the modulation frequency is superimposed on a DC signal. The light source 922 emits laser light that is frequency modulated according to the signal waveform of the modulation frequency. The light source 922 is controlled so that the center wavelength of the modulation of laser light becomes the center wavelength of the absorption spectrum of the gas to be measured 903, and so that the wavelength modulation width of the laser light becomes 2.2 times the FWHM of the absorption spectrum of the gas to be measured 903.

The optical amplifier 932 amplifies the laser light emitted from the light source 922. The driver 931 drives the optical amplifier 932. The lens 941 converts the laser light amplified by the optical amplifier 932 into collimated light and emits the collimated light as the measurement light 901 toward the gas to be measured 903.

After being emitted from the lens 941, the measurement light 901 passes through the gas to be measured 903 and is reflected or scattered by a scattering body 904, such as a wall. The reflected or scattered light returns to the gas analyzer 90 through the gas to be measured 903. The light returning to the gas analyzer 90 is also referred to as returned light 902. The returned light 902 is incident on the lens 942. The gas analyzer 90 detects the returned light 902 incident on the lens 942 with the photodetector 95 and analyzes the frequency spectrum of the returned light 902 to measure the concentration of the gas to be measured 903. The distance from the lenses 941 and 942 to the scattering body 904 is represented by L.

The lens 942 focuses the returned light 902, which is the laser light that has passed through the gas to be measured 903 and returned to the gas analyzer 90 by being reflected or scattered by the scattering body 904, onto the photodetector 95. The photodetector 95 converts the returned light 902 into an electric signal and outputs the electric signal as a received light signal. The amplifier 96 amplifies the received light signal inputted from the photodetector 95 and outputs the received light signal as an amplified signal. The amplification ratio of the signal in the amplifier 96 is set appropriately according to the intensity of the returned light 902 incident on the photodetector 95.

The LIA 97 detects specific frequency components from the amplified signal using the signal waveform of the modulation frequency inputted from the waveform generator 91. Specifically, the LIA 97 detects a component of the first harmonic and a component of the second harmonic of the modulation frequency from the amplified signal. The component of the first harmonic of the modulation frequency is represented by $P_f$. The component of the second harmonic of the modulation frequency is represented by $P_{2f}$.

The signal processor 98 calculates the concentration of the gas to be measured 903 based on the component of the first harmonic and the component of the second harmonic detected by the LIA 97. Specifically, the signal processor 98 calculates the value yielded by dividing the intensity of the second harmonic component by the intensity of the first harmonic component as the concentration signal. The concentration signal is represented by $P_C$. The signal processor 98 calculates the concentration of the gas to be measured 903 based on a calibration curve that represents the relationship between the concentration signal and the concentration of the gas to be measured 903.

Figure 2:
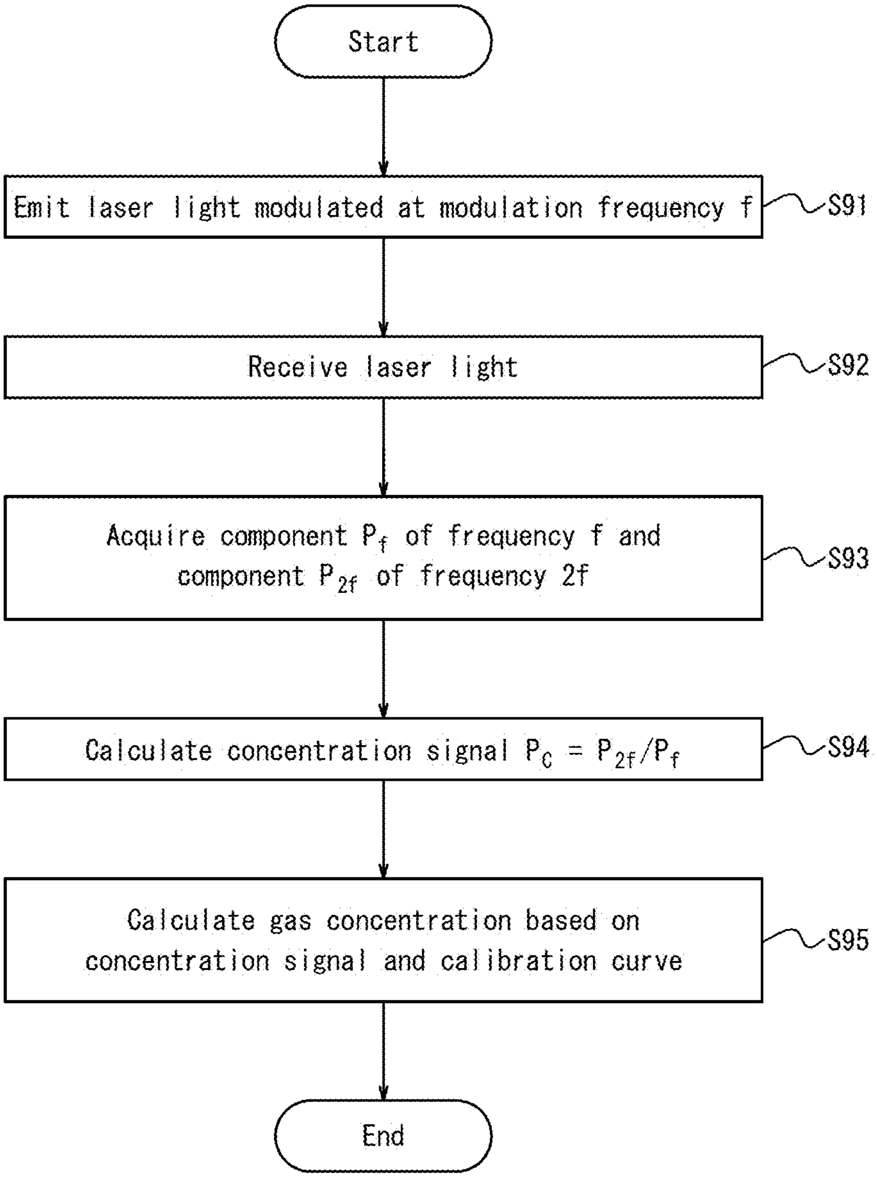
FIG. 2 is a flowchart illustrating the procedures of a gas analysis method according to a comparative example.

The gas analyzer 90 according to the comparative example measures the concentration of the gas to be measured 903 by performing the procedures in the flowchart illustrated in FIG. 2. The gas analyzer 90 emits laser light modulated at a modulation frequency f from the lens 941 (step S91). The gas analyzer 90 uses the lens 942 to focus the laser light returned after passing through the gas to be measured 903 and receives the focused light with the photodetector 95 (step S92). The gas analyzer 90 uses the LIA 97 to acquire, from an amplified signal yielded by amplifying the received light signal, a component ($P_f$) of the first harmonic (f) of the modulation frequency and a component ($P_{2f}$) of the second harmonic (2f) of the modulation frequency (step S93). The gas analyzer 90 calculates the concentration signal ($P_C$) by calculating $P_{2f}/P_f$ with the signal processor 98 (step S94). The gas analyzer 90 calculates the concentration of the gas to be measured 903 based on the concentration signal and the calibration curve (step S95).

In the case of measuring the concentration of the gas to be measured 903 with the gas analyzer 90 according to the comparative example, the following three problems may arise.

Figure 3:
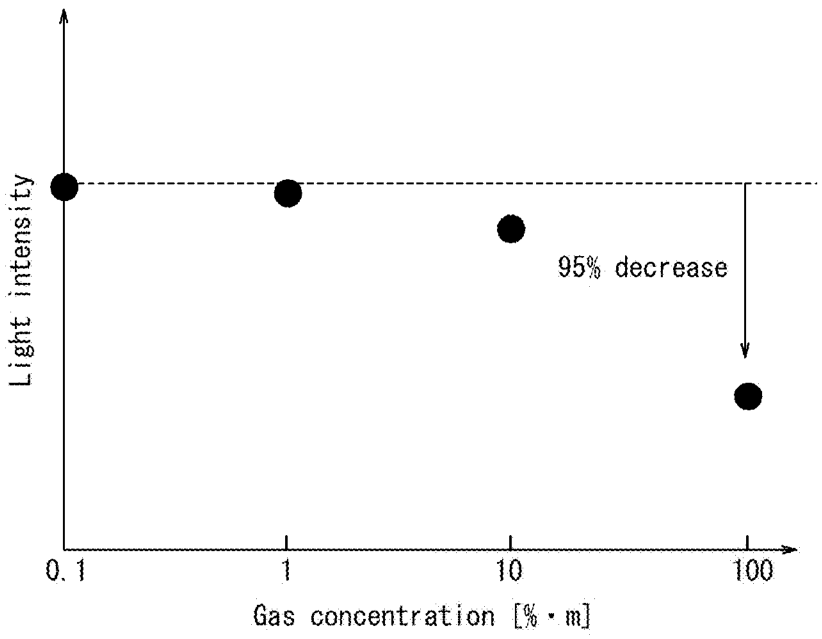
FIG. 3 is a graph illustrating the relationship between intensity of returned light detected by the gas analysis method according to the comparative example and gas concentration.

The first problem is a decrease in the intensity of the returned light 902. As illustrated in FIG. 3, the intensity of the returned light 902 decreases as the concentration of the gas to be measured 903 increases. The horizontal axis of the graph in FIG. 3 represents the gas concentration. The vertical axis represents the intensity of the returned light 902. The horizontal and vertical axes are logarithmic axes. The gas concentration corresponds to the value obtained by integrating, along the optical path through which the laser light passes, the concentration of the gas to be measured 903 at each part of the optical path. The intensity of the returned light 902 decreases as the gas concentration increases.

As described above, the intensity of the returned light 902 decreases as the gas concentration increases. If the intensity of the returned light 902 decreases significantly, it may be difficult for the gas analyzer 90 to detect the returned light 902. If the gas concentration is high due to a gas leak, the gas analyzer 90 may not be able to detect the gas leak due to an inability to detect the returned light 902. In particular, when the gas analyzer 90 is used outdoors, it may be impossible to distinguish between a case in which the measurement light 901 is emitted towards the air or the like, where no scattering body 904 is located, and the case in which the intensity of the returned light 902 is greatly decreased due to an increased gas concentration.

One possible way of distinguishing between the case in which no scattering body 904 is present and the case in which the gas concentration is high would be to emit a measurement light 901 with an off-peak frequency outside of the absorption spectrum of the gas to be measured 903. However, measuring after changing the frequency increases the measurement time.

Figure 4:
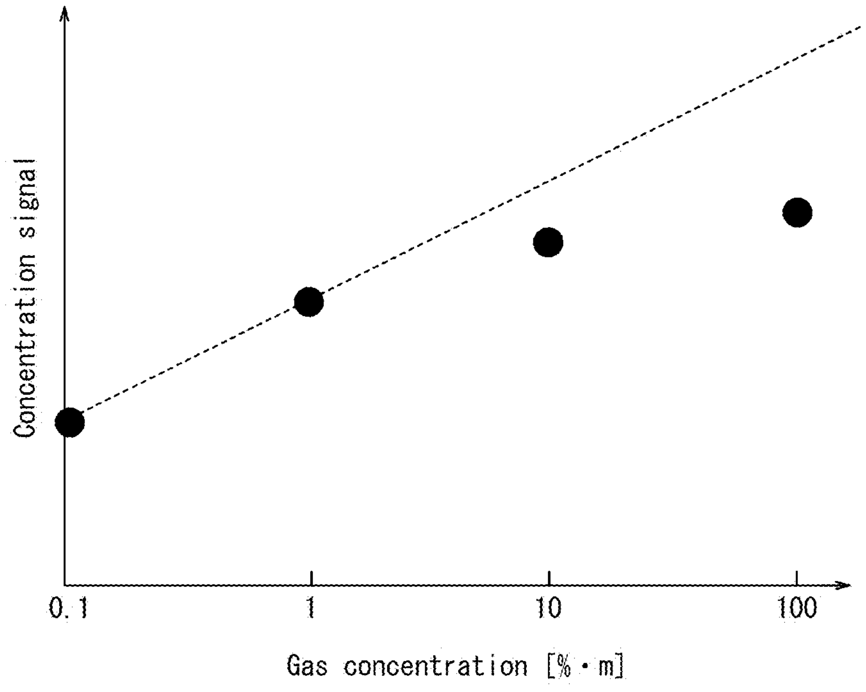
FIG. 4 is a graph illustrating the relationship between a concentration signal calculated by the gas analysis method according to the comparative example and gas concentration.

The second problem is a deterioration in the linearity of the calibration curve. As illustrated in FIG. 4, the calibration curve representing the relationship between the gas concentration and the concentration signal deviates from the linear relationship represented by a dashed line. In other words, the linearity of the calibration curve deteriorates. The horizontal axis of the graph in FIG. 4 represents the gas concentration. The vertical axis represents the concentration signal. The horizontal and vertical axes are logarithmic axes. One possible cause of the deterioration in the linearity of the calibration curve is, for example, that the effect of waveform distortion increases as the gas concentration is higher. Deterioration in the linearity of the calibration curve causes a decrease in the measurement accuracy of the concentration of the gas to be measured 903.

The third problem is the effect of vibration of the scattering body 904. When a wall, pipe, or the like acting as the scattering body 904 vibrates, a component of the vibration frequency of the scattering body 904 is superimposed on the returned light 902. If the vibration frequency of the scattering body 904 is close to the modulation frequency of the laser light, the concentration signal is affected by the vibration of the scattering body 904. As a result, the measurement accuracy of the concentration of the gas to be measured 903 is reduced.

As described above, problems may arise in the case of measuring the concentration of the gas to be measured 903 with the gas analyzer 90 according to the comparative example. Demand exists for achieving both measurement in the case of an elevated gas concentration and the improvement or maintenance of measurement accuracy.

A gas analyzer 10 (see FIG. 5) according to the present embodiment can achieve both measurement in the case of an elevated gas concentration and the improvement or maintenance of measurement accuracy. Embodiments of the present disclosure are now described with reference to the drawings.

(Overview of Gas Analyzer 10 According to Present Disclosure)

The gas analyzer 10 according to the present disclosure uses wavelength modulation spectroscopy (WMS) to measure the concentration of a gas to be measured 103 based on the absorbance of laser light transmitted through the gas to be measured 103. The gas analyzer 10 transmits laser light that is wavelength modulated at a plurality of modulation frequencies through the gas to be measured 103 to acquire the frequency spectrum of the light that passes through the gas to be measured 103 and returns. The plurality of modulation frequencies are represented by $f_{L1}$ to $f_{Ln}$, where n is a natural number equal to or greater than 2.

The laser light that is wavelength modulated at a plurality of modulation frequencies contains a component of frequency represented by a linear combination of each modulation frequency. The frequency represented by the linear combination of each modulation frequency is also referred to as the linear combination frequency. The linear combination frequency includes a plurality of frequencies. Therefore, the frequency spectrum of the light that returns after passing through the gas to be measured 103 includes a plurality of frequency components.

The gas analyzer 10 acquires, as the intensity of the returned light intensity signal ($P_{opt}$), the intensity of one frequency component among the plurality of frequency components of the frequency spectrum of the light that returns after passing through the gas to be measured 103. One frequency among the plurality of modulation frequencies ($f_{L1}$ to $f_{Ln}$) may be selected as the frequency of the component corresponding to the returned light intensity signal. Alternatively, one frequency included in the linear combination frequency may be selected as the frequency of the component corresponding to the returned light intensity signal.

The gas analyzer 10 acquires the signal of one or more frequency components, within the frequency spectrum of the light that returns after passing through the gas to be measured 103, as a signal containing information about the concentration of the gas to be measured 103. The information about the concentration of the gas to be measured 103 is also referred to as concentration information. The intensity of the signal containing the concentration information is represented by $P'_{C1}$ to $P'_{Cm}$, where m is a natural number that is equal to or greater than 1 and may be determined independently from the value of n.

The gas analyzer 10 calculates the ratio of the intensity of the signal containing the concentration information to the intensity of the returned light intensity signal. The ratio of the intensity of the signal containing the concentration information ($P'_{C1}$ to $P'_{Cm}$) to the intensity of the returned light intensity signal ($P_{opt}$) is represented by $P_{C1}$ to $P_{Cm}$. Specifically, $P_{C1}$ is calculated as $P'_{C1}/P_{opt}$ when i is a natural number equal to or greater than 1 and equal to or less than m.

$P_{C1}$ to $P_{Cm}$ is the signal intensity obtained by dividing the signal containing the concentration information ($P'_{C1}$ to $P'_{Cm}$) by the intensity of the returned light intensity signal ($P_{opt}$) and is also referred to as the intensity of the concentration signal. In other words, the concentration signal is a signal obtained by dividing the signal containing the concentration information ($P'_{C1}$ to $P'_{Cm}$) by the intensity of the returned light intensity signal ($P_{opt}$). The concentration signal is a signal corresponding to the concentration of the gas to be measured 103 or a signal that can be converted to the concentration of the gas to be measured 103. The intensity of the concentration signal is a value corresponding to the concentration of the gas to be measured 103 or a value that can be converted to the concentration of the gas to be measured 103. On the other hand, $P'_{C1}$ to $P'_{Cm}$ is the intensity of the signal that is converted to the intensity of the concentration signal by being divided by the intensity of the returned light intensity signal and is also referred to as the pre-conversion intensity of the concentration signal.

The intensity of the concentration signal corresponds to the concentration of the gas to be measured 103. The gas analyzer 10 calculates the concentration of the gas to be measured 103 based on the intensity of the concentration signal. The gas analyzer 10 may calculate the concentration of the gas to be measured 103 from the intensity of the concentration signal based on a calibration curve, formula, table, or the like that identifies the relationship between the intensity of the concentration signal and the concentration of the gas to be measured 103.

The gas analyzer 10 may acquire the intensity of one concentration signal based on the intensity of one frequency component of the returned light 102. In other words, the gas analyzer 10 may calculate the intensity of one concentration signal ($P_{C1}$) by dividing one signal containing the concentration information ($P'_{C1}$) by the intensity of the returned light intensity signal ($P_{opt}$). In the case of acquiring the intensity of one concentration signal, the gas analyzer 10 calculates one candidate value as the measured value of the concentration of the gas to be measured 103, based on the intensity of the one acquired concentration signal.

The gas analyzer 10 may acquire the intensity of a plurality of concentration signals based on the intensities of a plurality of frequency components of the returned light 102. In other words, the gas analyzer 10 may calculate the intensity of a plurality of concentration signals ($P_{C1}$ to $P_{Cm}$) by dividing a plurality of signals containing the concentration information ($P'_{C1}$ to $P'_{Cm}$) by the intensity of the returned light intensity signal ($P_{opt}$). In the case of acquiring the intensities of a plurality of concentration signals, the gas analyzer 10 calculates a plurality of values that become candidates for the measured value of the gas concentration, based on the acquired intensities of the plurality of concentration signals. The values that become candidates for the measured values of the gas concentration are also referred to as candidate values of the gas concentration. In other words, the gas analyzer 10 may calculate a plurality of candidate values of the gas concentration in the case of acquiring the intensities of a plurality of concentration signals. The gas analyzer 10 may select one value among the plurality of candidate values of the gas concentration as the measured value of the concentration of the gas to be measured 103. The gas analyzer 10 may calculate an average of candidate values of the gas concentration as the measured value of the concentration of the gas to be measured 103. The gas analyzer 10 may calculate various other statistics, such as the median of the plurality of candidate values of the gas concentration, as the measured value of the concentration of the gas to be measured 103. In other words, the gas analyzer 10 may calculate the measured value of the concentration of the gas to be measured 103 based on a plurality of candidate values of the gas concentration.

(Configuration Example of Gas Analyzer 10 According to Present Disclosure)

Figure 5:
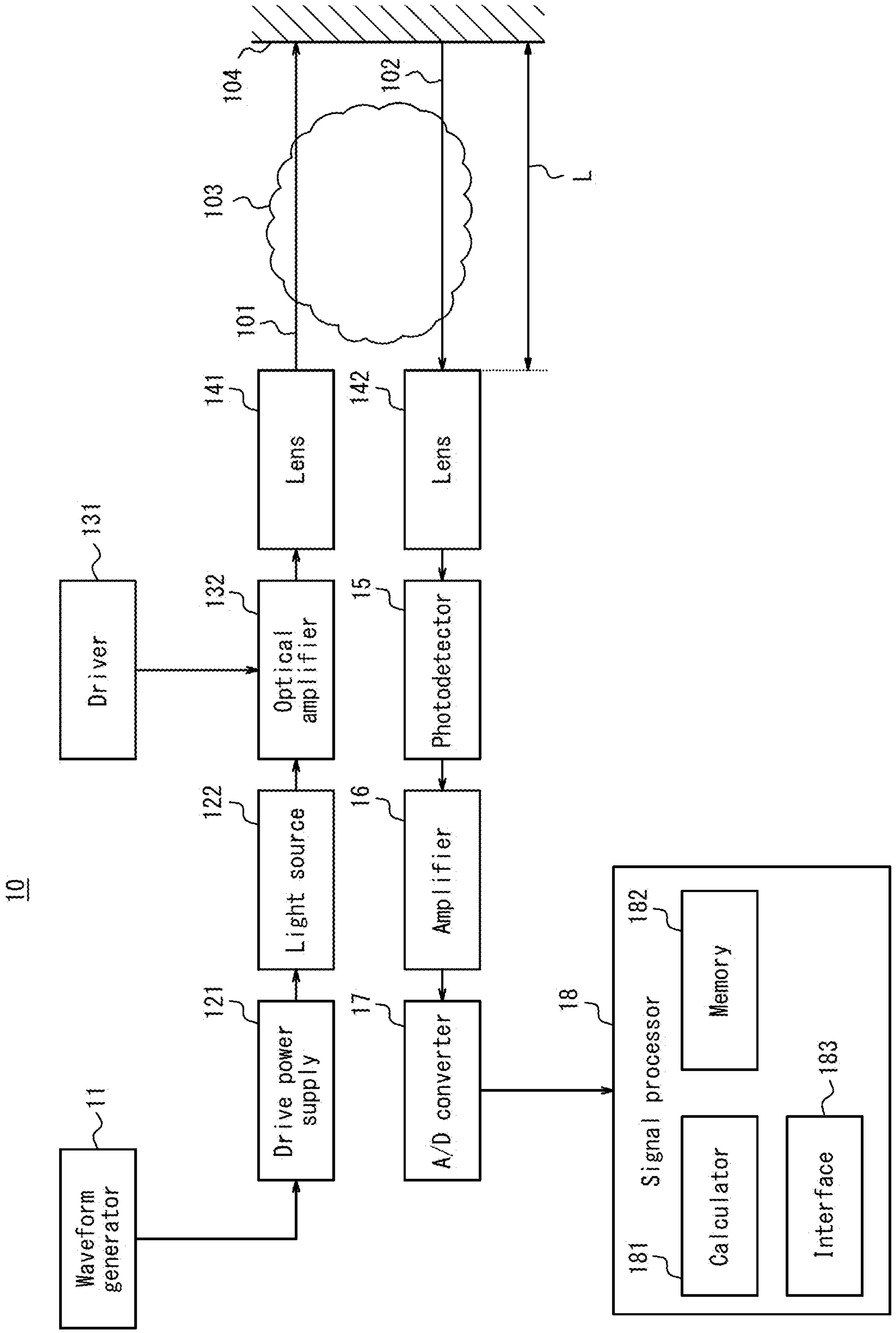
FIG. 5 is a schematic diagram illustrating a configuration example of a gas analyzer according to the present disclosure.

As illustrated in FIG. 5, the gas analyzer 10 according to an embodiment of the present disclosure includes a waveform generator 11, a drive power supply 121, a light source 122, a driver 131, an optical amplifier 132, lenses 141 and 142, a photodetector 15, an amplifier 16, an A/D converter 17, and a signal processor 18.

The waveform generator 11 generates a signal waveform of a plurality of modulation frequencies to be used for multiple modulation of measurement light 101 and outputs the signal waveform to the drive power supply 121 and the A/D converter 17. The waveform generator 11 may include an oscillator, a function generator, or the like. The waveform generator 11 may be configured to enable setting of the modulation frequency. The waveform generator 11 may be configured to enable setting of the number of modulation frequencies. In other words, the waveform generator 11 may be configured to enable setting of whether to generate a signal waveform subjected to double modulation or a signal waveform subjected to triple or greater modulation.

The drive power supply 121 is a power supply that drives the light source 122. The drive power supply 121 drives the light source 122 based on the signal waveform of the plurality of modulation frequencies inputted from the waveform generator 11. The drive power supply 121 outputs a drive signal to drive the light source 122. The drive signal may, for example, be a signal yielded by superimposing the respective AC signals of the plurality of modulation frequencies on a DC signal. The AC signals of the modulation frequencies may, for example, be sinusoidal signals or may be signals with other shapes. The drive power supply 121 may be configured to include a transistor, a laser driver IC (Integrated Circuit), or the like capable of supplying a drive current to the light source 122.

The light source 122 is a laser light source. The light source 122 emits laser light that is frequency modulated according to the signal waveform of the plurality of modulation frequencies. The light source 122 may be controlled so that the center wavelength of the modulation of laser light becomes the center wavelength of the absorption spectrum of the gas to be measured 103. The light source 122 may be a semiconductor laser. The semiconductor laser may, for example, include a Quantum Cascade Laser (QCL), an Interband Cascade Laser (ICL), or the like. The waveform generator 11 is configured to enable setting of the modulation frequency, and the light source 122 is thereby configured to enable setting of the modulation frequency.

The optical amplifier 132 amplifies the laser light emitted from the light source 122. The optical amplifier 132 may, for example, include an Optical Fiber Amplifier (OFA), a Semiconductor Optical Amplifier (SOA), or the like. The driver 131 drives the optical amplifier 132. The driver 131 may be configured to include elements capable of supplying excitation light, drive current, or the like to the optical amplifier 132.

The lens 141 converts the laser light amplified by the optical amplifier 132 into collimated light and emits the collimated light as the measurement light 101 toward the gas to be measured 103. The lens 141 may be configured to include a collimating lens. The lens 141 may be replaced by another optical element such as a parabolic mirror that can convert the laser light into collimated light.

The lens 142 focuses the returned light 102, which is the laser light that is emitted from the lens 141 and returns, on the photodetector 15. The lens 142 may be configured to include a condensing lens. The lens 142 may be replaced by another optical element, such as a parabolic mirror, that can focus the returned light 102 on the photodetector 15.

The photodetector 15 converts the returned light 102 into an electric signal and outputs the electric signal as a received light signal. The photodetector 15 may, for example, include a Photo Diode (PD) or the like.

The amplifier 16 amplifies the received light signal inputted from the photodetector 15 and outputs the received light signal as an amplified signal. The amplifier 16 may, for example, be configured to include elements such as transistors. In a case in which the photodetector 15 is a PD, the amplifier 16 may include a circuit that converts the photocurrent outputted by the photodetector 15 into a voltage.

The A/D converter 17 converts the amplified signal inputted from the amplifier 16 into a digital signal and outputs the digital signal to the signal processor 18.

The signal processor 18 analyzes the digital signal to calculate the frequency spectrum of the returned light 102. The signal processor 18 may calculate the frequency spectrum by performing a Fast Fourier Transform (FFT) on the digital signal. The signal processor 18 calculates the concentration signal based on the intensity of each frequency component included in the frequency spectrum of the returned light 102. The signal processor 18 calculates the concentration of the gas to be measured 103 from the concentration signal based on a calibration curve, relational equation, or table that represents the relationship between the concentration signal and the concentration of the gas to be measured 103.

The signal processor 18 includes a calculator 181, a memory 182, and an interface 183.

The calculator 181 may be configured to include a processor such as a Central Processing Unit (CPU) or a dedicated circuit such as a Field Programmable Gate Array (FPGA). The calculator 181 may be configured to execute a program that implements the functions of the signal processor 18.

The memory 182 may store various information used in the operation of the signal processor 18, programs for implementing the functions of the signal processor 18, and the like. The memory 182 may function as a working memory of the calculator 181. The memory 182 may, for example, be a semiconductor memory. The memory 182 may be configured as an integral part of the calculator 181 or may be configured separately.

The interface 183 may include a communication interface that communicates with the A/D converter 17 or the waveform generator 11, for example, by wired or wireless means. The communication interface may be configured to be capable of communication based on various communication standards such as RS-232C, RS-485, or Local Area Network (LAN). The communication standard is not limited to these examples and may be any of various other standards.

The interface 183 may include an input device that accepts input from a user. The input device may, for example, include a keyboard or physical keys, a touch panel or touch sensor, or a pointing device such as a mouse. The interface 183 may be configured to accept input from an external input apparatus.

The interface 183 may include a display device that displays information such as the results of gas concentration measurement. The display device may include various types of displays, such as a liquid crystal display. The interface 183 may be configured to output information such as the results of gas concentration measurement to an external display apparatus.

The interface 183 may include a speaker or other audio output device for emitting audio information, such as an alarm sound, in response to the result of gas concentration measurement. The interface 183 may be configured to output audio information to an external speaker or the like.

The interface 183 is not limited to these examples and may be configured to include a variety of other devices, and the interface 183 may be configured to connect to a variety of other devices.

The signal processor 18 may, for example, be a Personal Computer (PC). The signal processor 18 is not limited to the above examples and may be configured in various ways. The signal processor 18 may be configured as an integral part of the gas analyzer 10 or as a separate unit.

The signal processor 18 may be configured to enable setting of the modulation frequency for the waveform generator 11. The signal processor 18 may be configured to enable setting of the number of modulation frequencies. In other words, the signal processor 18 may be configured to enable setting of whether the laser light is subjected to double modulation or to triple or greater modulation. The signal processor 18 may be configured to set the modulation frequency based on user input.

(Operation Example of Gas Analyzer 10 According to Present Disclosure)

As described above, the gas analyzer 10 according to an embodiment of the present disclosure emits the measurement light 101 from the lens 141 toward the gas to be measured 103. The measurement light 101 is light that is multiply-modulated at a plurality of modulation frequencies. After being emitted from the lens 141, the measurement light 101 passes through the gas to be measured 103 and is reflected or scattered by a scattering body 104, such as a wall. The reflected or scattered light returns to the gas analyzer 10 through the gas to be measured 103. The light returning to the gas analyzer 10 is also referred to as returned light 102. The returned light 102 is incident on the lens 142. The gas analyzer 10 detects the returned light 102 incident on the lens 142 and analyzes the frequency spectrum of the returned light 102 using the calculator 181 of the signal processor 18 to measure the concentration of the gas to be measured 103. The distance from the lenses 141 and 142 to the scattering body 104 is represented by L.

<Frequency Spectrum of Doubly Modulated Laser Light>

In the present embodiment, the gas analyzer 10 measures the concentration of the gas to be measured 103 by emitting a laser light that is doubly modulated at two modulation frequencies as the measurement light 101. The two modulation frequencies include a first modulation frequency ($f_1$) and a second modulation frequency ($f_2$). The linear coupling frequency ($f_{DM}$) in laser light doubly modulated at the first modulation frequency ($f_1$) and the second modulation frequency ($f_2$) is expressed by $j \cdot f_1 + k \cdot f_2$. The coefficients j and k are integers.

Figure 6:
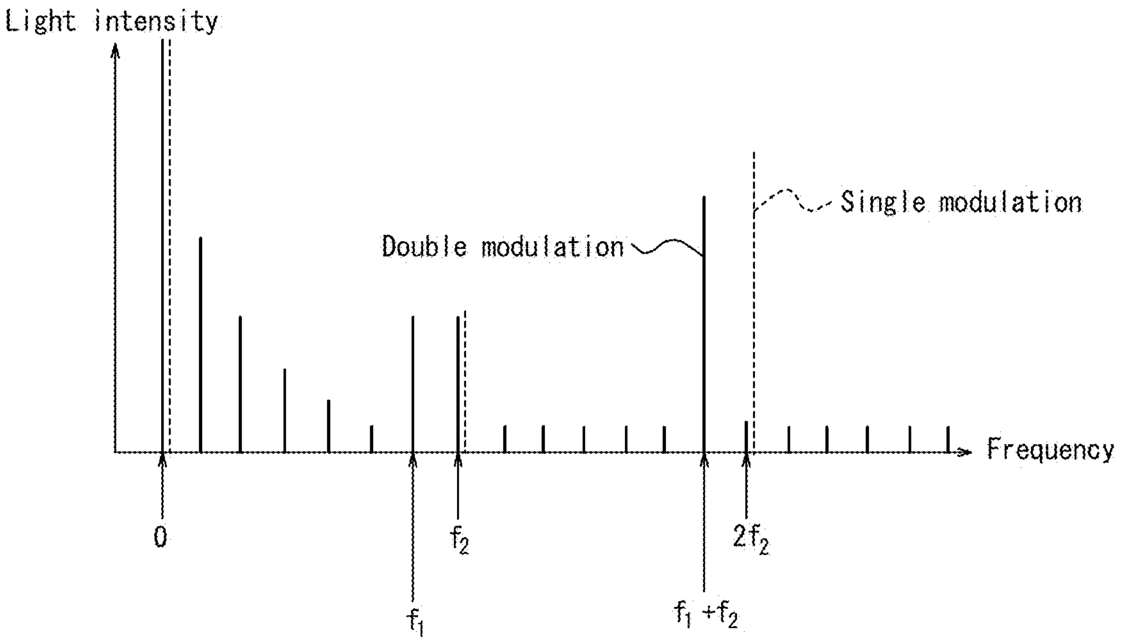
FIG. 6 is a graph illustrating an example of the frequency spectrum of returned light.

The gas analyzer 10 uses the photodetector 15 to detect the returned light 102 yielded by the doubly modulated measurement light 101 being transmitted through the gas to be measured 103 and returning. The gas analyzer 10 calculates the frequency spectrum of the returned light 102 by analyzing the received light signal of the returned light 102 using the signal processor 18. The frequency spectrum of the doubly modulated returned light 102 is illustrated in the graph in FIG. 6. The horizontal axis of the graph in FIG. 6 represents the frequency. The vertical axis represents the intensity of each frequency component. The doubly modulated returned light 102 is a laser light in which an AC component of the first modulation frequency and the second modulation frequency is superimposed on the DC component. Therefore, the doubly modulated returned light 102 has a DC component and a linear combination frequency component of the first modulation frequency and the second modulation frequency.

Specifically, the intensity of the DC component is larger in the frequency spectrum of the doubly modulated returned light 102 illustrated in FIG. 6. Additionally, the intensity of the component of the first modulation frequency ($f_1$) and the intensity of the component of the second modulation frequency ($f_2$) are larger. The intensity of the component of the frequency ($f_1+f_2$), which is the sum of the first modulation frequency and the second modulation frequency, is also larger. The intensity of the component at twice the frequency of the second modulation frequency ($2f_2$) is also larger than the other frequency components.

<<Suppression of Decrease in Returned Light Intensity Signal>>

As described above, the light intensity of the returned light 102 decreases as the gas concentration is higher. If the intensity of the returned light intensity signal decreases until, for example, falling below the noise level or below the lower limit of detection of the returned light intensity signal, the gas analyzer 10 cannot determine whether the returned light intensity signal has decreased due to the gas concentration being too high or for reasons such as the measurement light 101 being emitted into the air. The reasons why the gas analyzer 10 is unable to distinguish the decrease in the returned light intensity signal may include a shallow angle of incidence of the measurement light 101 on the scattering body 104, or the measurement light 101 being incident on a scattering body 104 having a mirror surface that is misoriented, in addition to the measurement light 101 being emitted into the air.

In a case in which a doubly modulated laser light is emitted as the measurement light 101, the frequency spectrum of the measurement light 101 and the returned light 102 includes a linear combination frequency component in addition to the modulation frequency component. In other words, the modulation frequency width of the measurement light 101 and the returned light 102 is pseudo-broadened. As a result, the frequency components of the frequency spectrum of the returned light 102 include frequency components that are offset from the peak frequency of the absorption spectrum of the gas to be measured 103 and are not easily absorbed by the gas to be measured 103. The calculator 181 of the signal processor 18 may calculate the intensity of a frequency component that tends not to be absorbed by the gas to be measured 103 as the intensity of the returned light intensity signal. The calculator 181 may calculate the sum of the intensities of each of a plurality of frequency components that tend not to be absorbed by the gas to be measured 103 as the intensity of the returned light intensity signal.

Here, as a target of comparison, suppose that a singly modulated measurement light 101, such that the laser light is modulated only at the second modulation frequency ($f_2$), is emitted. The frequency spectrum of the returned light 102 obtained in the case of single modulation is represented by a dashed line in FIG. 6. The singly modulated returned light 102 has a component of the first harmonic of the modulation frequency ($f_2$) and a component of the second harmonic of the modulation frequency ($2f_2$), in addition to the DC component.

In the case of single modulation, the component of the first harmonic of the modulation frequency is considered the returned light intensity signal. However, in a case in which the first harmonic of the modulation frequency is easily absorbed by the gas to be measured 103, the intensity of the returned light intensity signal is greatly reduced. On the other hand, the frequency spectrum of the doubly modulated returned light 102 has a frequency component other than the first harmonic of the modulation frequency. Therefore, in the case of double modulation, the frequency component that tends not to be absorbed by the gas to be measured 103 may be considered as the returned light intensity signal. The returned light intensity signal is consequently selected so that the intensity of the returned light intensity signal is less likely to decrease in the case of double modulation than in the case of single modulation.

Figure 7:
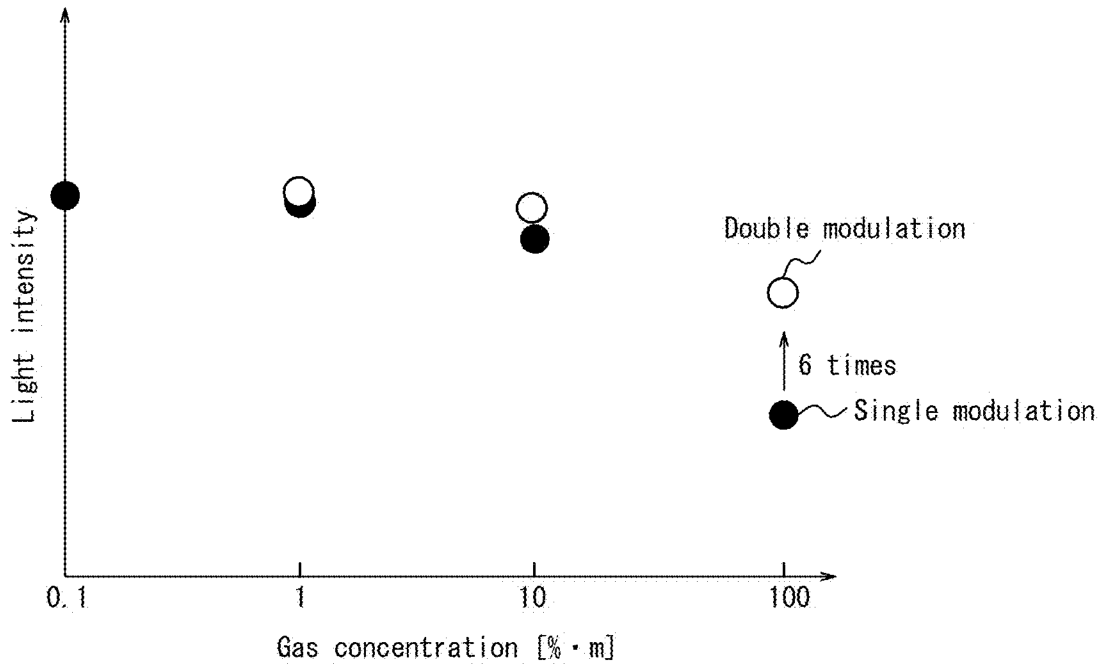
FIG. 7 is a graph illustrating an example of the relationship between intensity of returned light and gas concentration.

For example, as illustrated in FIG. 7, the intensity of the singly modulated returned light 102 decreases significantly as the gas concentration increases. On the other hand, the decrease in the intensity of the doubly modulated returned light 102 is smaller than in the case of single modulation. Specifically, in a case in which the gas concentration is 100 [%·m], the intensity of the doubly modulated returned light 102 is 6 times greater than the intensity of the singly modulated returned light 102.

As described above, the gas analyzer 10 according to the present disclosure can suppress the amount of decrease in the returned light intensity signal. Suppression of the decrease in the returned light intensity signal makes the returned light intensity signal less likely to degrade even when the gas concentration is high. As a result, a situation such that it becomes impossible to determine whether the returned light intensity signal decreased due to the gas concentration being too high or due to other reasons can be avoided.

<<High Sensitivity Measurement>>

As described above, the calculator 181 of the signal processor 18 in the gas analyzer 10 calculates the intensity of the concentration signal ($P_{C1}$ to $P_{Cm}$) by dividing the pre-conversion intensity of the concentration signal ($P'_{C1}$ to $P'_{Cm}$) by the intensity of the returned light intensity signal ($P_{opt}$) and calculates the concentration of the gas to be measured 103 from the intensity of the concentration signal.

The calculator 181 selects one frequency component from the plurality of frequency components of the returned light 102 as the returned light intensity signal. The calculator 181 also selects at least one frequency component from the plurality of frequency components of the returned light 102 as the concentration signal.

In the present operation example, the calculator 181 selects the component of the second modulation frequency ($f_2$) as the returned light intensity signal and selects the component of the second harmonic of the modulation frequency ($2f_2$) and the component of the frequency that is the sum of the first modulation frequency and the second modulation frequency ($f_1+f_2$) as the concentration signals.

In the frequency spectrum of the returned light 102 illustrated in FIG. 6, the intensity of the component of the frequency that is the sum of the first modulation frequency and second modulation frequency is larger than the intensity of the component of the second harmonic of the second modulation frequency. Therefore, in the case in which the component of the frequency that is the sum of the first modulation frequency and second modulation frequency is selected as the concentration signal, the intensity of the concentration signal is greater than the noise level even when the gas concentration is low. Consequently, in a case in which the component of the frequency that is the sum of the first modulation frequency and the second modulation frequency is selected as the concentration signal, the gas concentration is measured with high sensitivity.

Figure 8:
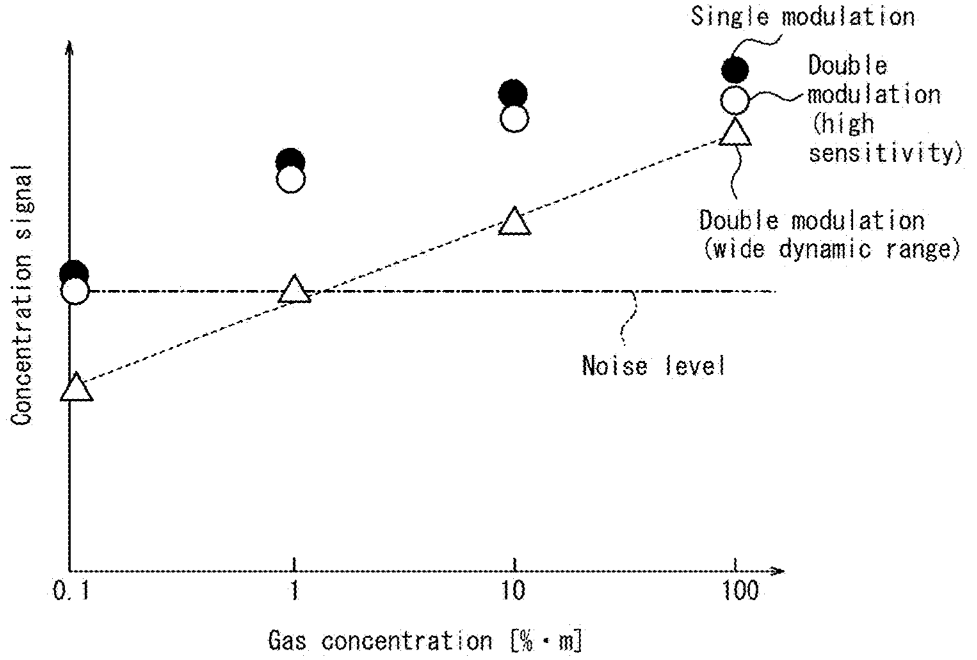
FIG. 8 is a graph illustrating an example of the relationship between a concentration signal and gas concentration.

The graph in FIG. 8 illustrates the relationship between gas concentration and the intensity of the concentration signal. The horizontal axis of the graph in FIG. 8 represents the gas concentration. The vertical axis represents the intensity of the concentration signal. The relationship between the gas concentration and the intensity of the concentration signal in the case in which the component of the frequency that is the sum of the first modulation frequency and the second modulation frequency is selected as the concentration signal is represented by the points plotted with a hollow circle as "double modulation (high sensitivity)". As a target of comparison, the relationship between the gas concentration and the intensity of the concentration signal in the case of single modulation is represented by the points plotted with a solid circle as "single modulation".

The noise level is represented by a dashed dotted line in the graph in FIG. 8. In the case of selecting the component of the frequency that is the sum of the first modulation frequency and the second modulation frequency as the concentration signal, the intensity of the concentration signal is larger than the noise level even in the region of low gas concentration. The sensitivity of the gas concentration measurement is therefore maintained as compared to the case of single modulation.

As described above, in the case of single modulation, it may be impossible to determine whether the intensity of the returned light intensity signal decreased due to the gas concentration being too high or for reasons such as the measurement light 101 being emitted into the air. In other words, in the case of single modulation, it may be impossible to determine the cause of the decrease in the intensity of the returned light intensity signal. On the other hand, by a doubly modulated laser light being emitted as the measurement light 101, a situation such that it becomes impossible to determine the cause of the decrease in the returned light intensity signal can be avoided. That is, by using a doubly modulated laser light, the gas analyzer 10 according to the present disclosure can maintain the sensitivity of the gas concentration at the same level as in the case of single modulation, while avoiding a situation such that it becomes impossible to determine the cause of the decrease in the returned light intensity signal.

<<Wide Dynamic Range Measurement>>

As described above, in the case in which the component of the frequency that is the sum of the first modulation frequency and the second modulation frequency is selected as the concentration signal, the sensitivity of the gas concentration measurement is maintained as in the case of single modulation. However, the calibration curve representing the relationship between the intensity of the concentration signal and the gas concentration in the case in which the component of the frequency that is the sum of the first modulation frequency and the second modulation frequency is selected as the concentration signal deviates from a straight line at higher gas concentrations, like the calibration curve in the case of single modulation. By using a doubly modulated laser light, the gas analyzer 10 according to the present disclosure can improve the linearity of the calibration curve in the range of higher gas concentrations.

Specifically, in FIG. 8, the calibration curve representing the relationship between the gas concentration and the intensity of the concentration signal in the case in which the component of the second harmonic of the second modulation frequency is selected as the concentration signal is represented by the points plotted with a hollow triangle as "double modulation (wide dynamic range)".

In the case in which the component of the second harmonic of the second modulation frequency is selected as the concentration signal, the calibration curve is linear over a wide range of gas concentrations, from a low (0.1 [%·m]) to high (100 [%·m]). The high linearity of the calibration curve over a wide range of gas concentrations widens the dynamic range of gas concentration measurement. In other words, the dynamic range of gas concentration measurement becomes wider in the case in which the component of the second harmonic of the second modulation frequency is selected as the concentration signal.

The following are possible reasons why the calibration curve is linear over a wide range of gas concentrations. The intensity of the component of the second harmonic of the second modulation frequency is smaller than the intensity of the frequency that is the sum of the first modulation frequency and second modulation frequency. Consequently, the intensity of the component of the second harmonic of the second modulation frequency is less likely to be saturated than the intensity of the frequency that is the sum of the first modulation frequency and second modulation frequency. In other words, the waveform of the component of the second harmonic of the second modulation frequency is less distorted in the range of high gas concentrations than the waveform of the component of the frequency that is the sum of the first modulation frequency and the second modulation frequency. The distortion of the waveform affects the relationship between the gas concentration and the intensity of the concentration signal. Therefore, it is thought that the calibration curve becomes linear even in the range of high gas concentrations due to the waveform being less distorted.

<<Selection Between High Sensitivity Measurement and Wide Dynamic Range Measurement>>

As described above, the calculator 181 of the signal processor 18 in the gas analyzer 10 can measure the gas concentration over a wide dynamic range in the case in which the component of the second harmonic of the second modulation frequency is selected as the concentration signal. However, according to the graph illustrated in FIG. 8, the intensity of the concentration signal in the case of measuring the gas concentration over a wide dynamic range is below the noise level in the range of gas concentrations below 1 [%·m]. In other words, in the case of measuring the gas concentration over a wide dynamic range, the measurement sensitivity decreases.

Conversely, the calculator 181 can measure gas concentration with high sensitivity in the case in which a component of the frequency that is the sum of the first modulation frequency and the second modulation frequency is selected as the concentration signal. However, according to the graph illustrated in FIG. 8, the linearity of the calibration curve representing the relationship between the gas concentration and the intensity of the concentration signal deteriorates when the gas concentration is in a range of 10 [%·m] or higher. In other words, the dynamic range becomes narrower in the case of measuring gas concentration with high sensitivity.

As discussed above, a trade-off may exist between wide dynamic range measurement and high sensitivity measurement. The calculator 181 may measure the gas concentration by combining the wide dynamic range measurement and the high sensitivity measurement to complement each other, so that the trade-off can be resolved. Specifically, the calculator 181 may adopt the measured value from the high sensitivity measurement when the gas concentration is low and the measured value from the wide dynamic range measurement when the gas concentration is high.

In the calibration curve illustrated in FIG. 8, the concentration signal in the calibration curve for double modulation (wide dynamic range) is well above the noise level when the gas concentration is in a range of 10 [%·m] or higher. Therefore, the calculator 181 may adopt the measured value for wide dynamic range measurement by selecting the component of the second harmonic of the second modulation frequency as the concentration signal when the gas concentration is in a range of 10 [%·m] or higher and adopt the measured value for high sensitivity measurement by selecting the component of the frequency that is the sum of the first modulation frequency and the second modulation frequency as the concentration signal when the gas concentration is in a range below 10 [%·m].

The boundary value of the gas concentration for selecting between wide dynamic range measurement and high sensitivity measurement is not limited to the example described above. In the calibration curve illustrated in FIG. 8, the concentration signal in the calibration curve for double modulation (wide dynamic range) is below the noise level when the gas concentration is in a range of 1 [%·m] or lower. Therefore, the calculator 181 may adopt the measured value for high sensitivity measurement by selecting the component of the frequency that is the sum of the first modulation frequency and the second modulation frequency as the concentration signal when the gas concentration is in a range of 1 [%·m] or lower and adopt the measured value for wide dynamic range measurement by selecting the component of the second harmonic of the second modulation frequency as the concentration signal when the gas concentration is in a range higher than 1 [%·m].

The calculator 181 may adopt the measured value for high sensitivity measurement when the gas concentration is in a range of 1 [%·m] or lower, adopt the measured value for wide dynamic range measurement when the gas concentration is in a range of 10 [%·m] or higher, and appropriately select between the measured value for high sensitivity measurement and the measured value for wide dynamic range measurement when the gas concentration is in a range higher than 1 [%·m] and lower than 10 [%·m].

As described above, by using a doubly modulated laser light, the gas analyzer 10 can select different frequency components as concentration signals depending on the gas concentration, thereby improving the accuracy of gas concentration measurement. On the other hand, in the case of single modulation, it is difficult to select different frequency components as the concentration signal, since the frequency components of the returned light 102 are only multiples of the modulation frequency. In other words, by using a doubly modulated laser light, the gas analyzer 10 according to the present disclosure can improve the measurement accuracy of gas concentration as compared to the case of single modulation.

<<Effects of Noise at Specific Frequencies>>

Noise of a specific frequency, such as the vibration frequency of the scattering body 104, may be superimposed on the returned light 102. In other words, the laser light used by the gas analyzer 10 to measure gas concentration may be affected by noise of a specific frequency. By using a doubly modulated laser light, the gas analyzer 10 according to the present disclosure can measure the gas concentration based on each frequency component in a plurality of frequency components included in the frequency spectrum of the returned light 102. The gas analyzer 10 can reduce the effect of noise and improve the measurement accuracy of gas concentration by selecting a frequency component that differs from the noise when noise of a specific frequency is present.

Figure 9:
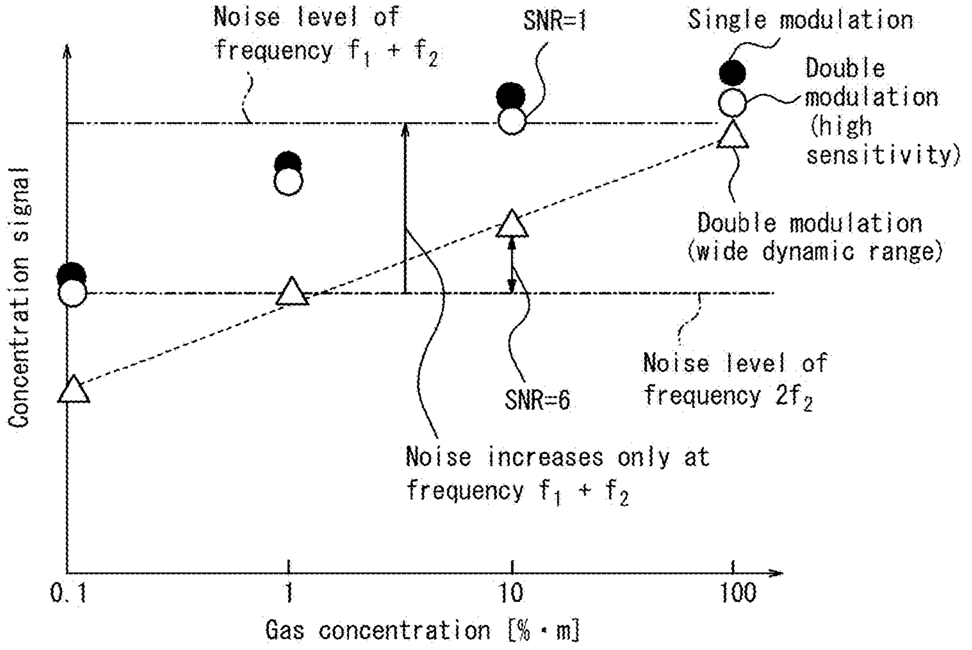
FIG. 9 is a graph illustrating the case in which the noise level increases only at the frequency corresponding to double modulation (high sensitivity) in the graph in FIG. 8.

For example, suppose that the vibration frequency of the scattering body 104 matches the frequency of the sum of the first modulation frequency and the second modulation frequency ($f_1+f_2$). In this case, as illustrated in FIG. 9, only the noise level of the component of the frequency that is the sum of the first modulation frequency and the second modulation frequency ($f_1+f_2$), represented by a dashed double-dotted line, is higher than the noise level of the component of the second harmonic of the second modulation frequency ($2f_2$), represented by a dashed dotted line.

In the case of a gas concentration of 10 [%·m], the noise level of the component of the frequency ($f_1+f_2$) is higher, thereby reducing the signal-to-noise (SN) ratio of the concentration signal for double modulation (high sensitivity), i.e., the case in which the component of the frequency that is the sum of the first modulation frequency and the second modulation frequency is selected as the concentration signal, to 1.

On the other hand, the noise level of the component of frequency ($2f_2$) is not increased, thereby yielding a sufficiently large SN ratio of 6 for the concentration signal for double modulation (wide dynamic range), i.e., the case in which the component of the second harmonic of the second modulation frequency is selected as the concentration signal.

Figure 10:
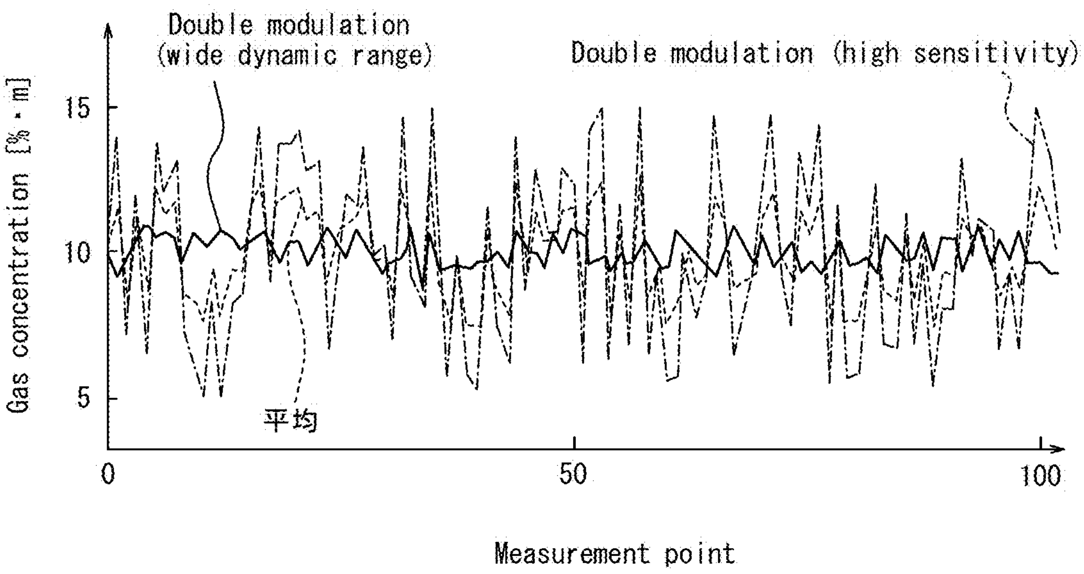
FIG. 10 is a graph illustrating variation in the measured value of gas concentration.

The graph in FIG. 10 illustrates the respective variations of the gas concentration calculated by high sensitivity measurement with an SN ratio of 1 and the gas concentration calculated by wide dynamic range measurement with an SN ratio of 6. The horizontal axis of the graph in FIG. 10 represents the measurement point for each of 100 calculations of the gas concentration. The vertical axis represents the gas concentration calculated at each measurement point.

The variation in the gas concentration calculated by high sensitivity measurement with an SN ratio of 1 is represented by a dashed dotted line. The standard deviation, which represents variation, of the gas concentration calculated by high sensitivity measurement with an SN ratio of 1 is 2.95.

The variation in gas concentration calculated by wide dynamic range measurement with an SN ratio of 6 is represented by a solid line. The standard deviation, which represents variation, of the gas concentration calculated by dynamic range measurement with an SN ratio of 6 is 0.51.

In a case in which the SN ratio of the concentration signal in each measurement can be acquired, the calculator 181 of the signal processor 18 in the gas analyzer 10 may select, as the measured value of the gas concentration, the gas concentration calculated by the measurement with the higher SN ratio between the gas concentration calculated by high sensitivity measurement and the gas concentration calculated by wide dynamic range measurement. In a case in which the SN ratio of the concentration signal in one measurement can be acquired, the calculator 181 may determine, based on the SN ratio, whether to select the gas concentration calculated by that measurement as the measured value of the gas concentration. Selection based on the SN ratio reduces the effect of noise.

The calculator 181 may select the gas concentration with the smaller standard deviation as the measured value of the gas concentration. In a case in which the calculation accuracy of the gas concentration according to one of the measurements is determined to be deteriorating, the calculator 181 may select the gas concentration calculated by the measurement for which the calculation accuracy is not deteriorating as the measured value of the gas concentration. Selection based on the standard deviation reduces the effect of noise.

In a case in which one of the gas concentration calculated by high sensitivity measurement and the gas concentration calculated by wide dynamic range measurement cannot be selected, the calculator 181 may calculate the average of the gas concentrations calculated by the two measurements as the measured value of the gas concentration.

The calculator 181 may calculate the root mean square of the gas concentration calculated by high sensitivity measurement and the gas concentration calculated by wide dynamic range measurement as the average of the gas concentrations calculated by the two measurements. In the graph in FIG. 10, the variation of the average gas concentration is represented by a dashed line. The standard deviation representing the variation of the average gas concentration is 1.48.

The standard deviation of the average gas concentration is larger than the standard deviation of the gas concentration calculated by wide dynamic range measurement with an SN ratio of 6, but smaller than the standard deviation of the gas concentration calculated by high sensitivity measurement with an SN ratio of 1. If the calculator 181 were to forcibly select one gas concentration from the gas concentrations calculated by the two measurements, the accuracy of the gas concentration measurement would deteriorate significantly upon incorrect selection of the gas concentration with the larger variation.

By calculating the average of the gas concentrations calculated by two measurements as the measured value of the gas concentration, the gas analyzer 10 can avoid a situation such that the measurement accuracy deteriorates significantly due to incorrect selection when one of the two measurements is forcibly selected.

The calculator 181 may determine, based on user settings, whether to select one of the gas concentrations calculated by the two measurements as the measured value of the gas concentration, or to calculate the average of the gas concentrations calculated by the two measurements as the measured value of the gas concentration. The calculator 181 may accept input of the setting from the user by the input device of the interface 183.

As described above, the gas analyzer 10 can perform a plurality of types of measurements in parallel, with each frequency component in the plurality of frequency components selected as the concentration signal, by using a doubly modulated laser light. The gas analyzer 10 may select the measured value of the gas concentration from among the gas concentrations calculated by each type of measurement or may calculate an average of the gas concentrations calculated by each type of measurement as the measured value of the gas concentration. The ability of the gas analyzer 10 to perform a plurality of types of measurements in parallel enhances the accuracy of the gas concentration measurement without increasing the time required to measure the gas concentration.

The gas concentration calculated by each of the two measurements corresponds to a candidate value of gas concentration. The calculator 181 may select one of the two candidate values as the measured value of the gas concentration or may calculate the average of the two candidate values as the measured value of the gas concentration. The calculator 181 may select a measured value of the gas concentration from among the candidate values based on the gas concentration. The calculator 181 may select a measured value of the gas concentration from among the candidate values based on the SN ratio of the concentration signal.

<Flowchart Example>

Figure 11:
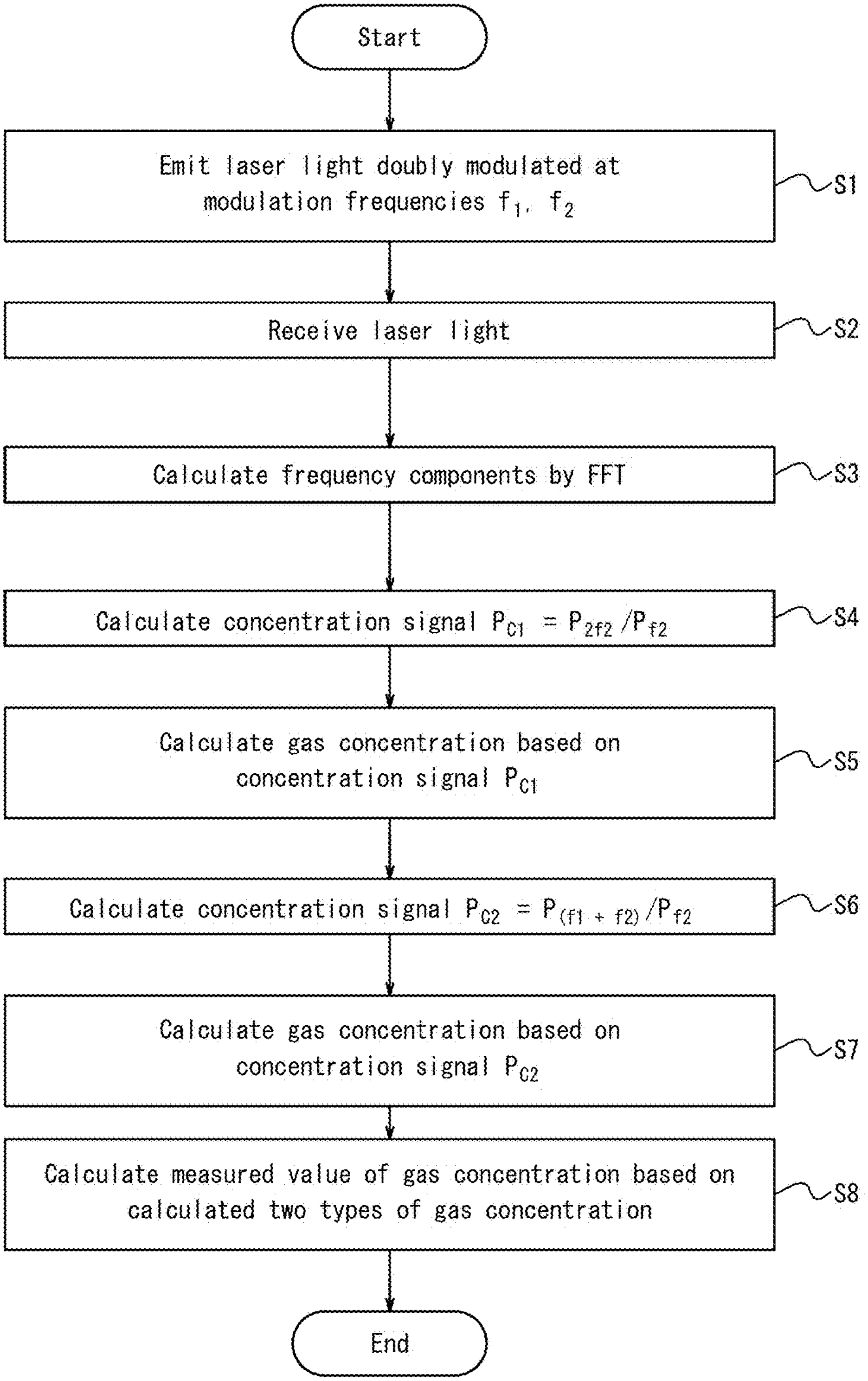
FIG. 11 is a flowchart illustrating the procedures of a gas analysis method according to the present disclosure.

The gas analyzer 10 may execute a gas analysis method including the example flowchart procedures illustrated in FIG. 11 to measure the concentration of the gas to be measured 103. At least some of the procedures of the gas analysis method may be realized as a gas analysis program to be executed by a processor that configures the calculator 181. The gas analysis program may be stored on a non-transitory computer readable medium.

The gas analyzer 10 emits a doubly modulated laser light modulated at a first modulation frequency $f_1$ and a second modulation frequency $f_2$ (step S1). The gas analyzer 10 receives the laser light that returns after being transmitted through the gas to be measured 103 and scattered or reflected by the scattering body 104 (step S2). The calculator 181 of the signal processor 18 in the gas analyzer 10 performs FFT on the received light signal of the laser light and calculates the frequency components of the laser light (step S3).

The calculator 181 calculates the value yielded by dividing the component of the second harmonic of the second modulation frequency by the component of the second modulation frequency as the intensity $P_{C1}$ of a first concentration signal (step S4). The calculator 181 calculates the gas concentration based on the intensity $P_{C1}$ of the first concentration signal (step S5).

The calculator 181 calculates the value yielded by dividing the component of the frequency that is the sum of the first modulation frequency and the second modulation frequency by the component of the second modulation frequency as the intensity $P_{C2}$ of a second concentration signal (step S6). The calculator 181 calculates the gas concentration based on the intensity $P_{C2}$ of the second concentration signal (step S7).

The calculator 181 calculates the measured value of gas concentration based on the two types of gas concentrations calculated in steps S4 through S7 (step S8). Specifically, the calculator 181 may select one of the gas concentration calculated based on the intensity of the first concentration signal and the gas concentration calculated based on the intensity of the second concentration signal and may then calculate the selected value as the measured value of the gas concentration. The calculator 181 may calculate the average of the gas concentration calculated based on the intensity of the first concentration signal and the gas concentration calculated based on the intensity of the second concentration signal as the measured value of the gas concentration.

After executing the procedure in step S8, the gas analyzer 10 ends execution of the procedures of the flowchart in FIG. 11.

SUMMARY

As described above, by using a doubly modulated laser light, the gas analyzer 10 according to the present disclosure can make the intensity of the returned light intensity signal less prone to decreasing when the gas concentration increases, while maintaining the measurement accuracy of the concentration of the gas to be measured 103, as compared to the case of using singly modulated laser light. Suppression of the decrease in intensity of the returned light intensity signal makes the returned light intensity signal less likely to degrade even when the gas concentration is high. As a result, a situation such that it becomes impossible to determine whether the returned light intensity signal decreased due to the gas concentration being too high or for reasons such as the measurement light 101 being emitted into the air can be avoided, even when the gas concentration is high.

By using a doubly modulated laser light, the gas analyzer 10 according to the present disclosure can select the concentration signal so that the linearity of the calibration curve increases. Wide dynamic range measurement can be performed by increasing the linearity of the calibration curve. As a result, the measurement accuracy of a wide range of gas concentrations can be improved as compared to the case of using singly modulated laser light.

By using a doubly modulated laser light, the gas analyzer 10 according to the present disclosure can select a concentration signal while avoiding a specific noise frequency caused by vibration of the scattering body 104 or other factors. The accuracy of gas concentration measurement is improved by selection of a concentration signal that avoids a specific noise frequency.

Embodiments of the present disclosure have been described with reference to the drawings, but specific configurations are not limited to these embodiments, and a variety of modifications may be made without departing from the spirit and scope thereof.

In the above embodiments, an example of operation in which the laser light is doubly modulated at two modulation frequencies has been described. In other embodiments, the gas analyzer 10 may multiply modulate the laser light at three or more modulation frequencies.

In the above embodiments, an example of operation in which high sensitivity measurement and a wide dynamic range measurement are performed in parallel to measure gas concentrations has been described. As another embodiment, the gas analyzer 10 may measure gas concentrations by performing three or more types of measurements in parallel and may calculate three or more candidate values of the gas concentration. The calculator 181 may select one of the three or more candidate values of the gas concentration as the measured value of the gas concentration. The calculator 181 may calculate the average of the three or more candidate values of the gas concentration as the measured value of the gas concentration or may calculate the average of some of the candidate values of the gas concentration among the three or more candidate values of the gas concentration as the measured value of the gas concentration.

The gas analyzer 10 may select the same frequency component or different frequency components as each of the returned light intensity signal used to calculate the intensity of the concentration signal and the returned light intensity signal used to determine whether a decrease in returned light intensity is due to the gas concentration being too high or is due to reasons such as the measurement light 101 being emitted into the air.

In the present embodiment, the gas to be measured 103 is a gas containing a component to be measured, such as oxygen ($O_2$), carbon monoxide (CO), or carbon dioxide ($CO_2$). The gas to be measured may include one or a plurality of components to be measured. The gas analyzer 10 may set the modulation frequency according to the characteristics of the components to be measured. By configuring the light source 122 to enable setting of the modulation frequency, the measurement light 101 is modulated appropriately according to the component to be measured. As a result, the accuracy of gas concentration measurement can be improved.

The invention claimed is:

1. A gas analyzer comprising:

a light source configured to emit multiply-modulated measurement light toward a gas to be measured, wherein the multiply modulated measurement light is modulated at a plurality of modulation frequencies;

a photodetector configured to receive returned light yielded by the multiply-modulated measurement light passing and coming back through the gas to be measured, and to convert the returned light into an electric signal; and a calculator configured to:

calculate an intensity of one concentration signal based on an intensity of one frequency component of the electric signal corresponding to the returned light, or intensities of a plurality of concentration signals based on respective intensities of a plurality of frequency components of the electric signal corresponding to the returned light, wherein the one frequency component or one of the plurality of frequency components is a component of a frequency represented by a linear combination of each of the plurality of modulation frequencies of the multiply-modulated measurement light; and calculate a measured value of concentration of the gas to be measured, based on the intensity of the one concentration signal or the intensities of the plurality of concentration signals.

2. The gas analyzer according to claim 1, wherein the calculator is configured to calculate a plurality of candidate values that become candidates for the measured value of concentration of the gas to be measured, based on the respective intensities of the plurality of concentration signals, and calculate the concentration of the gas to be measured, based on the plurality of candidate values.

3. The gas analyzer according to claim 2, wherein the calculator is configured to select one candidate value among the plurality of candidate values as the measured value of the concentration of the gas to be measured, based on a signal-to-noise ratio of the concentration signal.

4. The gas analyzer according to claim 2, wherein the calculator is configured to calculate an average of at least two candidate values among the plurality of candidate values as the measured value of the concentration of the gas to be measured.

5. The gas analyzer according to claim 1, wherein the light source is configured to enable setting of a modulation frequency of the measurement light.

6. The gas analyzer according to claim 1, wherein the calculator is configured to calculate the intensity of one concentration signal or at least one of the intensities of a plurality of concentration signals by dividing a signal containing concentration information by the intensity of one frequency component of the electric signal.

7. The gas analyzer according to claim 6, wherein the signal containing concentration information is a component of a second harmonic of a second modulation frequency.

8. The gas analyzer according to claim 1, wherein the calculator is configured to obtain the measured value of concentration from a high-sensitivity measurement when the gas concentration is low, and from a wide dynamic range measurement when the gas concentration is high.

9. The gas analyzer according to claim 8, wherein the calculator is configured to calculate the intensity of one concentration signal or at least one of the intensities of a plurality of concentration signals by dividing a signal containing concentration information by the intensity of one frequency component of the electric signal, wherein, in the high-sensitivity measurement, the signal containing concentration information is a component of a second harmonic of a second modulation frequency, and wherein, in the wide dynamic range measurement, the signal containing concentration information is a component of a linear combination frequency of the plurality of modulation frequencies.

10. A gas analysis method comprising:

emitting, by a light source of a gas analyzer, multiply-modulated measurement light toward a gas to be measured, wherein the multiply-modulated measurement light is modulated at a plurality of modulation frequencies;

receiving, by a photodetector of the gas analyzer, returned light yielded by the multiply-modulated measurement light passing and coming back through the gas to be measured, and converting the returned light into an electric signal;

calculating, by a calculator of the gas analyzer, an intensity of one concentration signal based on an intensity of one frequency component of the electric signal corresponding to the returned light, or intensities of a plurality of concentration signals based on respective intensities of a plurality of frequency components of the electric signal corresponding to the returned light, wherein the one frequency component or one of the plurality of frequency components is a component of a frequency represented by a linear combination of each of the plurality of modulation frequencies of the multiply-modulated measurement light; and calculating, by the calculator of the gas analyzer, a measured value of concentration of the gas to be measured, based on the intensity of the one concentration signal or the intensities of the plurality of concentration signals.

11. The gas analysis method according to claim 10, wherein the calculating of the intensity of one concentration signal or at least one of the intensities of a plurality of concentration signals comprises dividing a signal containing concentration information by the intensity of one frequency component of the electric signal.

12. The gas analysis method according to claim 11, wherein the signal containing concentration information is a component of a second harmonic of a second modulation frequency.

13. The gas analysis method according to claim 10, wherein the calculating of the measured value of concentration comprises obtaining the measured value from a high-sensitivity measurement when the gas concentration is low, and from a wide dynamic range measurement when the gas concentration is high.

14. The gas analysis method according to claim 13, wherein the calculating of the intensity of one concentration signal or at least one of the intensities of a plurality of concentration signals comprises dividing a signal containing concentration information by the intensity of one frequency component of the electric signal, wherein, in the high-sensitivity measurement, the signal containing concentration information is a component of a second harmonic of a second modulation frequency, and wherein, in the wide dynamic range measurement, the signal containing concentration information is a component of a linear combination frequency of the plurality of modulation frequencies.

15. The gas analysis method according to claim 10, wherein the multiply modulated measurement light is doubly modulated at two modulation frequencies.

16. The gas analysis method according to claim 10, wherein, when noise of a specific frequency is present, the method comprises selecting, as the one frequency component, a frequency component that differs from the noise.

17. The gas analyzer according to claim 1, wherein the multiply-modulated measurement light is doubly modulated at two modulation frequencies.

18. The gas analyzer according to claim 1, wherein the gas analyzer is configured to select, when noise of a specific frequency is present, a frequency component, as the one frequency component, that differs from the noise.

* * * * *